(12) United States Patent
Okubo et al.

(10) Patent No.: US 9,192,974 B2
(45) Date of Patent: Nov. 24, 2015

(54) WORK-PUNCHING DEVICE, WORK-PUNCHING METHOD, AND METHOD FOR PRODUCING ELEMENT FOR CONTINUOUSLY VARIABLE TRANSMISSION

(75) Inventors: Naruhiko Okubo, Tochigi (JP); Masaaki Fujita, Tochigi (JP); Shintaro Nakamura, Tochigi (JP); Shinsuke Onishi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 247 days.

(21) Appl. No.: 13/812,819

(22) PCT Filed: Jul. 5, 2011

(86) PCT No.: PCT/JP2011/065373
§ 371 (c)(1),
(2), (4) Date: Jan. 28, 2013

(87) PCT Pub. No.: WO2012/043005
PCT Pub. Date: Apr. 5, 2012

(65) Prior Publication Data
US 2013/0174626 A1    Jul. 11, 2013

(30) Foreign Application Priority Data

Sep. 30, 2010  (JP) ................. 2010-222726
Sep. 30, 2010  (JP) ................. 2010-222727
Dec. 9, 2010   (JP) ................. 2010-275017
Dec. 9, 2010   (JP) ................. 2010-275018

(51) Int. Cl.
| | |
|---|---|
| *B21D 28/02* | (2006.01) |
| *B21D 35/00* | (2006.01) |
| *B21D 28/06* | (2006.01) |
| *B21D 28/16* | (2006.01) |
| *B21D 43/04* | (2006.01) |
| *B21D 53/14* | (2006.01) |
| *F16G 5/06* | (2006.01) |

(52) U.S. Cl.
CPC ............. *B21D 28/02* (2013.01); *B21D 28/06* (2013.01); *B21D 28/16* (2013.01); *B21D 35/001* (2013.01); *B21D 43/04* (2013.01); *B21D 53/14* (2013.01); *F16G 5/06* (2013.01)

(58) Field of Classification Search
CPC ........ B21D 28/02; B21D 28/06; B21D 28/16; B21D 35/001; B21D 37/08; B21D 53/14; B21D 43/04; B21K 23/02; F16G 5/16
USPC ............. 72/15.5, 16.8, 16.9, 18.6, 18.8, 19.6, 72/327, 329, 330, 333, 336, 337, 379.2, 72/405.01, 404; 29/557, 558
See application file for complete search history.

(56) References Cited

U.S. PATENT DOCUMENTS

| | | | |
|---|---|---|---|
| 4,116,122 A * | 9/1978 | Linder et al. ................ | 100/48 |
| 6,453,716 B2 * | 9/2002 | Suzuki ........................ | 72/329 |
| 6,951,124 B2 * | 10/2005 | Kanamaru et al. .......... | 72/336 |
| 2001/0018843 A1 | 9/2001 | Suzuki | |

FOREIGN PATENT DOCUMENTS

| | | |
|---|---|---|
| JP | 63-199943 | 8/1988 |
| JP | 2001-246428 A | 9/2001 |

(Continued)

OTHER PUBLICATIONS

Japanese Office Action dated Jul. 22, 2014, 6 pages.

*Primary Examiner* — Peter DungBa Vo
*Assistant Examiner* — Joshua D Anderson
(74) *Attorney, Agent, or Firm* — Rankin, Hill & Clark LLP

(57) ABSTRACT

A work-punching device and work-punching method capable of appropriately changing a counter load is provided. Also, a method for manufacturing an element for continuously variable transmission with simple process is provided. A counter load may be controlled by increasing and decreasing a pressure of a fluid, when punching an element 10 from a metal band plate 20 while applying a counter load by a counter punch 113.

2 Claims, 11 Drawing Sheets

(56) References Cited

FOREIGN PATENT DOCUMENTS

| JP | 2005-531738 A | 10/2005 |
| JP | 3703678 B2 | 10/2005 |
| JP | 2006-051544 | 2/2006 |
| JP | 2006-192459 A | 7/2006 |
| JP | 4132820 B2 | 8/2008 |
| WO | 01/78919 A1 | 10/2001 |
| WO | WO 2004/004942 A1 | 1/2004 |

* cited by examiner

WORK-PUNCHING DEVICE, WORK-PUNCHING METHOD, AND METHOD FOR PRODUCING ELEMENT FOR CONTINUOUSLY VARIABLE TRANSMISSION

CROSS-REFERENCED TO RELATED APPLICATION

This application is a National Stage entry of International Application PCT/JP2011/065373, filed Jul. 5, 2011, which claims priority to Japanese Patent Application No. 2010-222726, filed Sep. 30, 2010, Japanese Patent Application 2010-222727, filed Sep. 30, 2010, Japanese Patent Application No. 2010-275017 filed Dec. 9, 2010, and Japanese Patent Application No. 2010-275018 filed Dec. 9, 2010, the disclosure of the prior applications are hereby incorporated in their entirety by reference.

TECHNICAL FIELD

The present invention relates to a work-punching device and a work-punching method of punching a work from a metal plate material while applying a counter load, and a method for manufacturing an element for a continuously variable transmission.

BACKGROUND ART

Generally, an element used for constituting a driving belt for a continuously variable transmission is equipped with a body portion with lateral sides thereof contacting a pulley of the continuously variable transmission, a neck portion connected to a center of an upper end of the body portion, and a head portion positioned on the neck portion. Lateral sides of the neck portion between the body portion and the head portion are concave portions for assembling the element to a pair of endless rings. The driving belt is constituted by assembling a plurality of the elements to the pair of endless rings via the concave portions.

Conventionally, the element for the continuously variable transmission is formed by punching the metal plate material. The technique related to a punching processing of the element is disclosed, for example, in Patent Document 1. In the punching processing method of the element for the continuously variable transmission disclosed in the document, a press device equipped with a forming punch which punches the metal plate material into a shape of the element, and a counter punch which descends together with the metal plate material, is used.

Thereafter, upon press forming, a constant counter load, which is an upward biasing force, is applied to the counter punch. Application of the counter load is performed by a counter unit using a disk spring. As a material of the element, a long metallic plate material having a plane portion equipped with a predetermined plate thickness, and having a pair of thinned portions via a pair of corner portions in a longitudinal direction of both side portions of a lower surface thereof, is used.

Further, Patent Document 2 discloses a general press device equipped with a processing punch and a processing die, and which implements a stamping processing or a punching processing to a general metal thin plate.

CITATION LIST

Patent Literature

Patent Literature 1: Japanese Patent No. 3703678
Patent Literature 2: Japanese Patent Laid-Open No. 2006-51544

SUMMARY OF INVENTION

Technical Problem

However, in the conventional punching processing method of the element for the continuously variable transmission mentioned above, the counter load is generated by the counter unit using the disk spring. Therefore, in order to adjust the counter load, it is necessary to interrupt the press forming, dismount a metal mold, disassemble the counter unit, and change the counter load, so that the adjusting operation is difficult. As such, there is a problem that the counter load cannot be adjusted appropriately and easily.

On the other hand, a plate thickness accuracy of the element formed by the punching receives influence of a plate thickness accuracy of the metal plate material used as the material. Therefore, in the case where the plate thickness accuracy of the metal material changed from the change of the lot of the material with the counter load left unadjusted, there is a fear that bias in the plate thickness of the element after punching is generated. Therefore, conventionally, the plate thickness accuracy of the material must be controlled strictly, making a manufacturing cost increase.

Further, in the processing method, a long metal plate material having a pair of the thinned portions at the side portions of the lower surface thereof is used as the material of the element. Therefore, a process of preliminarily preparing the long metal plate material having the thinned portion by passing the long metal plate material through a special mill role having a shape corresponding to the thinned portion, becomes necessary. Such process becomes a cause for increasing the manufacturing cost of the element The purpose of the present invention is, in view of such problems of the conventional technique, to provide a work-punching device and a work-punching method which is capable of changing the counter load appropriately and easily. Further, the purpose of the present invention is to provide a method for manufacturing an element for continuously variable transmission by a simple process suitable for such device and method.

Solution to Problem

In order to achieve this object, a work-punching device according to a first aspect of the invention is a work-punching device, including: a die; a transferring element which transfers a metal plate material onto the die; a punching punch which punches a work from the metal plate material transferred onto the die; and a counter punch which applies a counter load in a direction opposite to a punching direction by the punching punch to a portion of the metal plate material which becomes the work, wherein the work-punching device includes a counter load generating element which generates the counter load by applying a pressure of a fluid variably to the counter punch, and a control element which controls the counter load generating element by increasing and decreasing the pressure of the fluid.

According to the first aspect of the invention, the work-punching device is provided with the counter load generating element which generates the counter load by variably applying the pressure of the fluid to the counter punch, and the counter load generating element is controlled by increasing and decreasing the pressure of the fluid, so that it becomes possible to change the counter load appropriately and easily, without requiring conventional difficult adjusting operation.

The work-punching device according to a second aspect of the invention is characterized in that, in the first aspect of the invention, the work includes a body portion, with lateral sides thereof constituting contact surfaces contacting a pulley for a continuously variable transmission, and which includes a tapered portion in which a thickness of the body portion is gradually reduced or a thinned portion with a thinned thickness, from a predetermined vertical position to a lower end thereof, a neck portion which extends upward from a central portion of an upper end of the body portion, and a head portion positioned on the neck portion, and is processed into an element for the continuously variable transmission.

According thereto, upon processing of the element for the continuously variable transmission, the plate thickness accuracy of the element imparting influence on the performance of the continuously variable transmission, the element with high plate thickness accuracy may be punched, by appropriately adjusting the counter load according to the variation of the metal thickness accuracy of the metal plate material transferred for processing. Therefore, improvement of accuracy may be obtained while alleviating the operation related to the management of the plate thickness accuracy of the metal plate material, so that the manufacturing cost of the element may be reduced.

The work-punching device according to a third aspect of the invention is characterized in that, in the second aspect of the invention, the device includes a plate thickness detecting element which detects a plate thickness, wherein the control element includes a plate thickness measuring unit which measures the plate thickness with the plate thickness detecting element, and a counter load determining unit which determines the counter load to be generated by the counter load generating element, on the basis of a measurement result by the plate thickness measuring unit, wherein a measurement of the plate thickness of the metal plate material of a portion corresponding to the work, and a determination of the counter load on the basis of the measurement result, are performed at each punching of the work, prior to the punching thereof.

According thereto, the measurement of the plate thickness for the metal plate material of the portion corresponding to the work, and the determination of the counter load on the basis of the measurement result, are performed at each punching of the work, prior to the punching. As such, even in the case where the plate thickness of the metal plate material varied, it becomes possible to determine an appropriate counter load and perform punching, according to the variation. Therefore, it becomes possible to improve the plate thickness accuracy of the work after punching.

The work-punching device according to a fourth aspect of the invention is characterized in that the work-punching device according to the second aspect of the invention includes a plate thickness detecting element which detects a plate thickness, wherein the control element includes a plate thickness measuring unit which measures the plate thickness with the plate thickness detecting element, and a counter load determining unit which determines the counter load to be generated by the counter load generating element, on the basis of a measurement result by the plate thickness measuring unit, wherein a measurement of the plate thickness of the punched work is performed at each punching of the work, after punching thereof, and a determination of the counter load on the basis of the measurement result is performed prior to the punching of the next work.

According thereto, the plate thickness of the punched work is measured, and also the counter load is determined, at each punching of the work, after punching. As such, it becomes possible to appropriately determine the counter load according to the variation of the plate thickness of the work punched earlier, so that the subsequent punching of the work may be performed with appropriate counter load. Therefore, it becomes possible o improve the plate thickness accuracy of the punched work.

The work-punching device according to a fifth aspect of the invention is characterized in that, in the first aspect of the invention, wherein the metal plate material is a long-continuous metal band plate, the work-punching device includes a pilot hole forming element which forms a pilot hole and an opening surrounding the pilot hole at a predetermined interval in a length direction, with respect to the metal band plate transferred by the transferring element, the transferring element is for transferring and positioning the metal band plate via the pilot hole sequentially to downstream processing station, the work-punching device further includes a crushing processing station as the downstream processing station, the crushing processing station includes a crushing processing element which includes a die and a forming punch formed with a forming surface, and which implements a crushing processing by pressing the metal band plate placed on the die with the forming punch, a counter load applying element which applies a counter load to the die in a direction opposite to a pressing direction by the crushing processing element, and a load changing element which changes the counter load to be applied to the die.

According thereto, even if a flow of the metal is generated in the crushing processing by the crushing processing element, the flow of the metal is absorbed by the opening surrounding the pilot hole, so that it becomes possible to surely prevent the pilot hole itself from deforming. Therefore, a positioning accuracy using the pilot hole with respect to each processing stations after the crushing processing station may be maintained preferably.

The work-punching device according to a sixth aspect of the invention is characterized in that, in the first aspect of the invention, the metal plate material as a material includes only a flat plate-like portion having a constant plate thickness.

According thereto, it is not necessary to prepare, as the metal plate material as the material, a one implemented with a special processing such as preliminarily forming a thinned portion corresponding to the thinned portion of the work, so that processing cost of the work may be decreased. Further, in the case where the metal plate material consists only of the flat plate-like portion having a constant plate thickness, significant flow of the metal is generated when forming the tapered portion or the thinned portion of the work by crushing processing. However, as is explained above, the flow of he metal is absorbed by the opening surrounding the pilot hole, so that it does not become an obstacle in positioning accuracy by the pilot hole.

The work-punching device according to a seventh aspect of the invention is characterize in that, in the fifth aspect of the invention, the device includes a positioning pin to be inserted into the pilot hole, wherein a hole for inserting the positioning pin is formed to the forming punch and the die, and when the crushing processing is implemented, the pilot hole remains inserted with the positioning pin through the holes of the processing punch and the die.

According thereto, it becomes possible to surely prevent the pilot hole from deforming when the crushing processing is implemented by the crushing processing element.

The work-punching device according to an eighth aspect of the invention is characterized in that, in the third aspect of the invention, the measurement of the plate thickness performed at each punching of the work is performed to portions corresponding to both end portions of a body upper portion which is a portion of the body portion above the predetermined vertical position, and to both end portions of the head portion.

According thereto, it becomes possible to improve the plate thickness accuracy of the portions corresponding to the both end portions of the body upper portion and the both end portions of the head portion, that are required to have high plate thickness accuracy, so that it becomes possible to manufacture the element with good performance.

A work-punching method according to a ninth aspect of the invention is characterized in that it includes a process of punching a work using the work-punching device according to the first aspect of the invention.

According thereto, when punching the work, the counter load of the work-punching device may be appropriately increased and decreased according to the plate thickness of the metal plate used as the material of the work, or to the thickness of the punched work, so that the size accuracy of the obtained work may be improved. Therefore, it becomes possible to alleviate the operation related to the management of the plate thickness accuracy of the metal plate material, and to reduce the manufacturing cost of the work.

A method for manufacturing an element for a continuously variable transmission according to a tenth aspect of the invention is a method for manufacturing an element for a continuously variable transmission, the element including a body portion, with lateral sides thereof contacting a pulley for the continuously variable transmission, and which has a thinned portion with a thickness thinned or gradually reduced from a predetermined vertical position to a lower end thereof, a neck portion which extends upward from a center of an upper end of the body portion, and a head portion positioned on the neck portion, the method including: a preparation process of preparing a metal band plate having a width capable of forming an even number of rows of elements in a width direction, in a form of the head portions of the elements butted against each other, or in a form of the body portions of the elements butted against each other, and having an uniform plate thickness; a punching and removing process of punching the metal band plate along a punching line including a line set so as to draw a trimmed portion of a predetermined width outside of a contour of a lateral sides and lower side of a portion which becomes the body portion in the metal band plate, and removing the metal band plate portion outside of the trimmed portion; a plastic processing process of forming the plate thickness of a portion which becomes the thinned portion, and forming a predetermined convex-concave portion, by pressing and crushing from the portion which becomes the thinned portion of the body portion to the trimmed portion by a coining processing, with respect to a processing target portion of the metal band plate completed with the punching and removing process; and an element punching process of punching a portion which becomes the element from the metal band plate after the plastic processing process.

According thereto, after leaving the trimmed portion of a predetermined width corresponding to the portion which becomes the body portion and removing the outer side thereof by the punching and removing process, the plate thickness of the portion which becomes the thinned portion is formed by the coining processing, so that it becomes possible to adjust the volume of the metal band plate portion pressed and crushed by the coining processing, by appropriately selecting the width of the trimmed portion. By adjusting this volume, it becomes possible to control the magnitude of the flow of the metal by the pressing and crushing, and to obtain an appropriate plate thickness for the portion which becomes the body portion.

Therefore, it is not necessary to preliminarily prepare a metal band plate as a coiled material with a portion with the plate thickness thereof thinned corresponding to the thinned portion is formed throughout the material by a roll processing and the like, such as in the conventional technique, and the element with high accuracy may be manufactured by implementing the punching and removing process, the plastic processing process, the element punching process and the like, directly to the metal band plate having an overall uniform plate thickness.

The method for manufacturing the element for the continuously variable transmission according to an eleventh aspect of the invention is characterized in that, in the tenth aspect of the invention, in a case of forming the even number of rows of elements in the width direction, in the form of the head portions thereof butted against each other, the method includes a piercing hole forming process of forming a piercing hole between portions which become the head portions butted against each other in a processing target portion of the plastic processing process, prior to the plastic processing process.

According thereto, in the coining processing in the plastic processing process, the flow of metal toward the center in the width direction of the metal band plate is generated. However, the flow of the metal is absorbed by the contraction of the piercing hole provided between the portions which become the head portions. By doing so, it becomes possible to prevent the thickness of the portion which becomes the neck portion of the element and the like from becoming excessively large. Further, it becomes possible to adjust the flow of the metal and to easily control the plate thickness of the portion which becomes the neck portion and the like, by appropriately selecting the size of the piercing hole.

Therefore, the element with high plate thickness accuracy may be manufactured, without the need for using the conventional method requiring cumbersome process, such as cutting a flat plate from a metal band plate, forming a notch portion in an approximate midway of the flat plate, and cutting elements from the flat plate. Further, unlike such conventional method, it becomes possible to avoid the plate thickness of the central portion of the metal band itself from becoming thick.

The method for manufacturing the element for the continuously variable transmission according to a twelfth aspect of the invention is characterized in that, in the eleventh aspect of the invention, the piercing hole is formed in a slit-shape.

According thereto, it becomes possible to easily adjust the magnitude of the flow of the metal, and to control the plate thickness of the portion which becomes the neck portion and the like, by appropriately selecting the size of the piercing hole in the longitudinal direction.

The method for manufacturing the element for the continuously variable transmission according to a thirteenth aspect of the invention is characterized in that, in the tenth aspect of the invention, the method includes, prior to the punching and removing process, a pilot hole forming process of forming a pilot hole, and an opening surrounding the pilot hole, sequentially in a predetermined interval, to the metal band plate transferred, and a transferring and positioning process of sequentially transferring and positioning the metal band plate portion formed with the pilot hole and the opening, via the pilot hole, to each processing station for performing the punching and removing process, the plastic processing process, and element punching process.

According thereto, in the plastic processing process, even if the flow of the metal is generated, the flow of the metal is absorbed by the opening surrounding the pilot hole, so that it becomes possible to surely prevent the pilot hole itself from deforming. Therefore, it becomes possible to favorably maintain the positioning accuracy using the pilot hole with respect to each processing station.

The method for manufacturing the element for the continuously variable transmission according to a fourteenth aspect of the invention is characterized in that, in the thirteenth aspect of the invention, in the plastic processing process, a positioning pin for positioning a processing target portion of the process is inserted to the pilot hole corresponding to the processing target portion.

According thereto, even in the case where the flow of metal is generated by the coining processing, it becomes possible to surely prevent the deformation of the pilot hole.

The method for manufacturing the element for the continuously variable transmission according to a fifteenth aspect of the invention is characterized in that, in the tenth aspect of the invention, the element punching process includes a punching processing process of performing punching of the portion which becomes the element, by a press device, with a set counter load, a plate thickness measuring process of measuring a plate thickness of a predetermined portion of the portion which becomes the element punched in the punching processing process, and a counter load setting process of setting the counter load, on the basis of a measurement result by the plate thickness measuring process, prior to the next element punching process.

According thereto, each time the element punching process is performed, the measurement result by the plate thickness measurement process for the portion which becomes the element performed with the punching processing is fed back, and the setting of the counter load is performed, so that it becomes possible to improve the plate thickness accuracy of the element after the punching processing, and to manufacture the element with good size accuracy, by performing appropriate feedback.

The method for manufacturing the element for the continuously variable transmission according to a sixteenth aspect of the invention is characterized in that, in the tenth aspect of the invention, the element punching process includes a plate thickness measuring process of measuring a plate thickness of a predetermined portion of the portion which becomes the element, prior to the punching of the portion which becomes the element, a counter load setting process of performing setting of a counter load at a press device which performs punching of the portion which becomes the element, on the basis of a measurement result by the plate thickness measuring process, and a punching processing process of performing punching of the portion which becomes the element, by the press device set with the counter load by the counter load setting process.

According thereto, each time the element punching process if performed, the plate thickness measurement for the portion which becomes the element is performed prior to the punching processing process, the result thereof is fed back, and the setting of the counter load is performed, so that it becomes possible to improve the plate thickness accuracy of the portion which becomes the element to which the punching processing is performed, and to manufacture the element with good size accuracy, by performing appropriate feedback.

The method for manufacturing the element for the continuously variable transmission according to a seventeenth aspect of the invention is characterized in that, in the fifteenth aspect of the invention, the predetermined portion where the plate thickness is measured is portions corresponding to both end portions of a body upper portion which is a portion of the body portion above the predetermined vertical position, and to both end portions of the head portion.

According thereto, it becomes possible to improve the plate thickness accuracy of the portions corresponding to both end portions of the body upper portion and the both end portions of the head portion, that are required to have high plate thickness accuracy, and to manufacture the element with good performance.

DESCRIPTION OF EMBODIMENTS

Figure 1A:
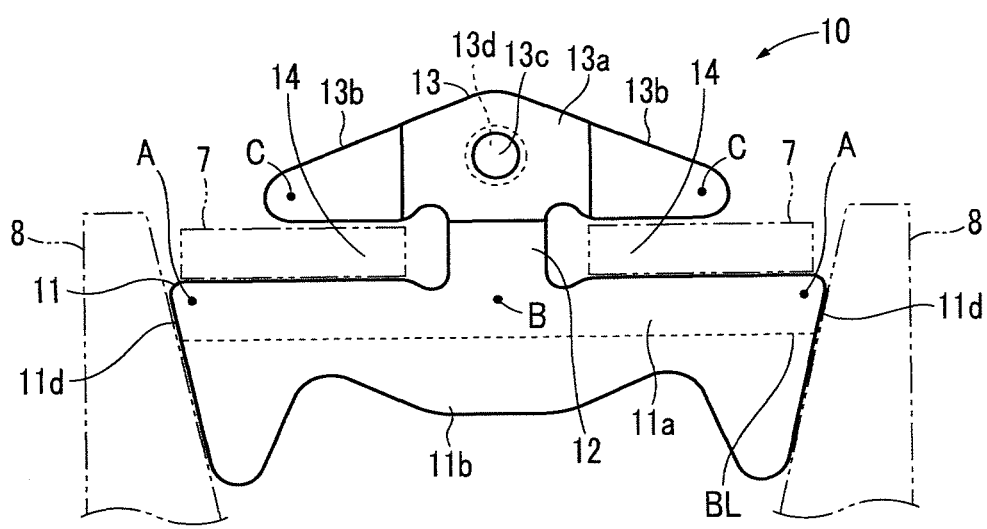
FIG. 1(a) shows a front view.

An embodiment of the present invention will be described below in more detail referring to the appended drawings. FIGS. 1(a) and (b) are a front view and a side view of an element manufactured by one embodiment of the present invention. The element 10 is used for constituting a belt for a continuously variable transmission, by stacking a number of elements and assembling the same to a pair of endless rings. In FIG. 1(a), an endless ring 7 to which the element 10 is assembled, and a pulley 8 of the continuously variable transmission to which the belt for the continuously variable transmission is placed around, are indicated by an imaginary line (two dot-and-dash line).

As is shown in FIG. 1(a), the element 10 is equipped with a body portion 11 which is assembled to a pair of the endless rings 7, a neck portion 12 extending upward with a constant width narrower than a width of the body portion 11, taking a center of an upper end of the body portion 11 as a center, and a head portion 13 of an isosceles triangular shape provided via the neck portion 12 so that a center of a base of the head portion 13 is positioned at a center of an upper end of the neck portion 12.

A plurality of the elements 10 are assembled to a pair of the endless rings 7, and are overlapped annularly in a thickness direction while contacting the pulley 8 of the continuously variable transmission, so as to configure the belt for the continuously variable transmission. At this time, the body portion 11 is positioned at an inner peripheral side of the belt for the continuously variable transmission, and the head portion 13 is positioned at an outer peripheral side thereof.

To lateral sides of the neck portion 12, concave portions 14 are formed by right and left side walls of the neck portion 12, a lower end of the head portion 13, and an upper end of the body portion 11. The element 10 is configured to be assembled to a pair of the endless rings 7 via the concave portions 14.

Figure 1B:
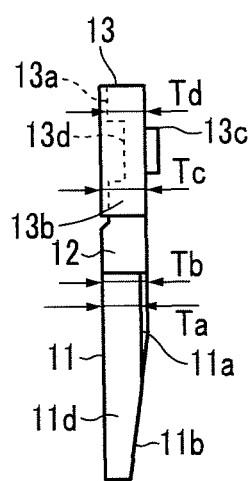
FIG. 1(b) shows a side view of an element manufactured by a method for manufacturing an element for a continuously variable transmission using a work-punching device according to an embodiment of the present invention.

The body portion 11 is equipped with a body upper portion 11a constituting a substantially upper half upward from a boundary line BL, and a tapered portion or a thinned portion 11b having a plate thickness thinner than other portions and constituting a substantially lower half downward from the boundary line BL. The tapered portion or the thinned portion 11b has a same plate thickness with a lower end of the body upper portion 11a at an upper end thereof, and as is shown in FIG. 1(b), the plate thickness thereof gradually decreases towards a lower end thereof.

The gradual decrease of the plate thickness of the thinned portion 11b may be the one in which the plate thickness decreases at a large proportion from the upper end of the thinned portion 11b to a predetermined position therebeneath, and decrease at a small proportion from the predetermined position downward. However, as is shown in FIG. 1(b), rear surfaces of the body upper portion 11a, the thinned portion 11b, and the neck portion 12 are planes common among these.

The thickness of the body upper portion 11a is set so that a thickness Tb at a central portion B is thicker than a thickness Ta at both end portions A in the lateral direction. That is, a surface of the body upper portion 11a slightly elevates from the both end portions A to the central portion B.

As is shown in FIG. 1(a), a central portion of the lower end of the thinned portion 11b projects slightly downwardly in a convex shape, and both ends thereof extend downwardly more than the central portion. Lateral side surfaces 11d of the body portion 11 configured from the both side surfaces of the body upper portion 11a and both side surfaces of the thinned portion 11b constitute contact surfaces contacting with the pulley 8 of the continuously variable transmission in the belt for the continuously variable transmission.

The head portion 13 includes a central portion 13a adjacent to the upper end of the neck portion 12, and lateral side portions 13b adjacent to both sides of the central portion 13a. A nose 13c is provided to a surface side of a center of the central portion 13a, and a hole 13d which is fitted to the nose 13c of the adjacent element 10 is provided to a rear surface side of thereof.

In the belt for the continuously variable transmission, the nose 13c of each element 10 is fitted to the hole 13d of the adjacent element 10, so that the elements 10 are aligned on a pair of the endless rings 7. Further, at the portion of the belt for the continuously variable transmission positioned on the pulley 8, the adjacent elements 10 contact at a portion of the boundary line BL at the lower end of the body upper portion 11a, and incline with respect to each other taking the portion as a supporting point. By doing so, the belt for the continuously variable transmission bend at a curvature corresponding to the pulley 8.

When the plate thickness at both end portions A of the body upper portion 11a is taken as Ta, the plate thickness of the central portion (a lower region of the neck portion 12) B is taken as Tb, the plate thickness of both end portions C of the head portion 13 as Tc, and the plate thickness of the central portion 13a (an upper region of the neck portion 12) is taken as Td, then a relationship of Tc≥Tb>Ta, Tc>Td exists between these plate thicknesses.

Figure 15:
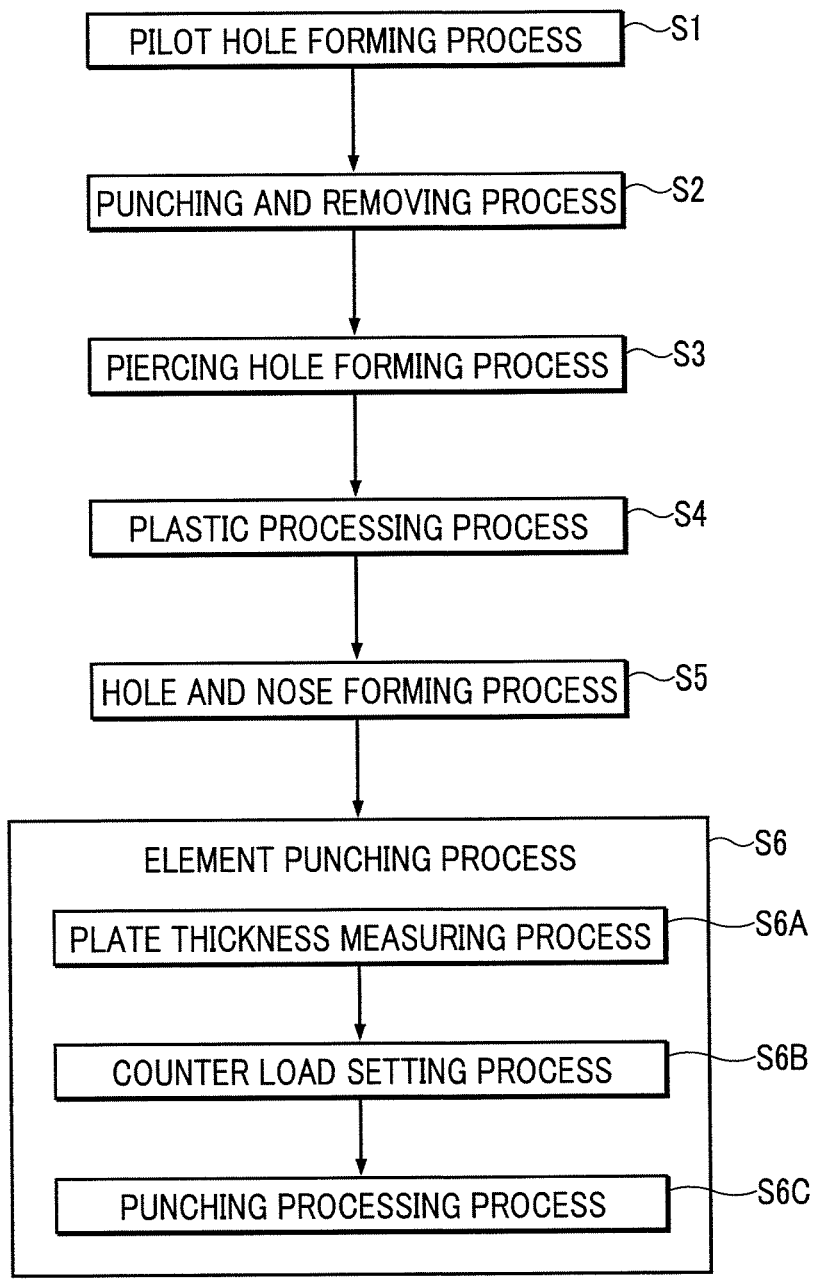
FIG. 15 A flow chart showing a manufacturing method of the element.

In manufacturing the element 10, first, a preparation process of preparing a metal band plate as a material to be processed into the element 10 is performed. Thereafter, the prepared metal band plate is sequentially transferred to each processing station, not shown, for each processing target portion that repeatedly appear at a constant interval in a length direction of the prepared metal band plate, and are provided to the manufacturing of the element 10. At each processing station, each of processing processes S1 through S6 shown in FIG. 15 are performed.

That is, first, in a first processing station, a pilot hole forming process S1 of forming a pilot hole for sequentially positioning each processing target portion with respect to each of the following processing stations, to each of the processing target positions, is performed. In the subsequent processing station, a punching and removing process S2 of punching a predetermined portion on each processing target portion and removing the same, is performed. In the subsequent processing station, a piercing hole forming process S3 of forming a predetermined piercing hole with respect to each processing target portion, is performed.

Further, in the subsequent processing station, a plastic processing process S4 of providing plastic processing for forming a plate thickness at a predetermined portion in each processing target portion, is performed. In the subsequent processing station, a hole and nose forming process S5 of forming the nose 13c and the hole 13d, is performed. Thereafter, in the last processing station, an element punching process S6 of punching the portion which becomes the element 10 (a work), is performed. The contents of the processing in each processing processes S1 through S6 will be explained later.

Figure 2:
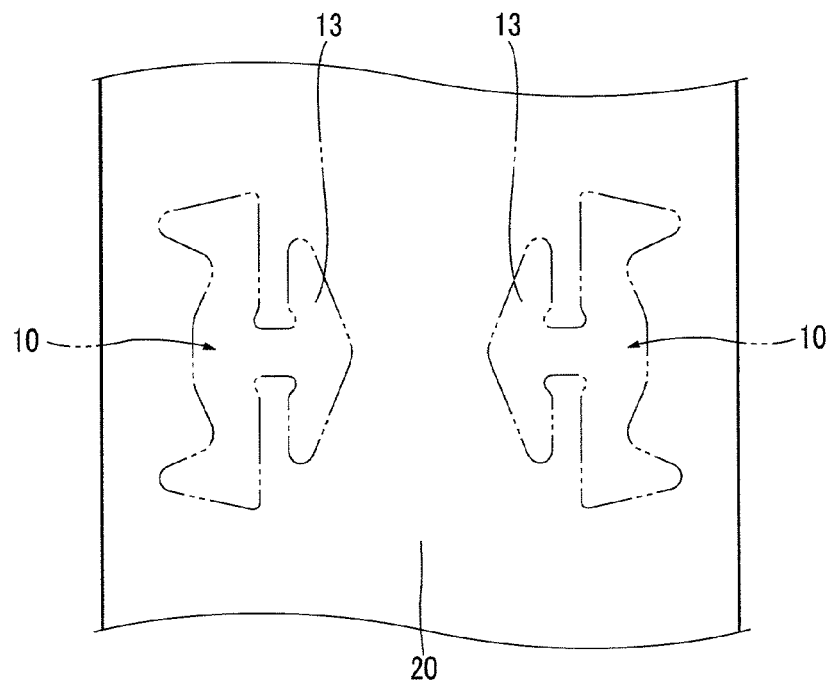
FIG. 2 A plane view showing a metal band plate adopted in the present embodiment.

FIG. 2 shows the metal band plate prepared in the preparation process explained above. The metal band plate 20 is also called a coiled material or a steel band, and is a metal band plate having uniform plate thickness. A two dot-and-dash line in the figure is an imaginary line of a portion which becomes the element 10 formed from the metal band plate 20. Hereinafter, the portion which becomes the element 10 or the portion which becomes the head portion 13 are called with a "corresponding portion" attached, such as "a corresponding portion of the element 10" and "a corresponding portion of the head portion 13", and are indicated in the figures with the identical reference.

As is shown in FIG. 2, two elements 10 are formed from the metal band plate 20 portion of a predetermined length. However, in the metal band plate 20, the two corresponding portions of the element 10 coincide with the length direction of the metal band plate 20 in the lateral direction thereof, and the head portion 13 side are opposed to each other. That is, the metal band plate 20 has a width which is capable of forming two elements 10 in a state where the head portions 13 are butted against each other.

In stead thereto, the metal band plate 20 may be the one having a width which is capable of forming two elements 10 in a state where the body portions 11 are butted against each other, a width which is capable of forming four elements 10 in a state where the body portions 11, the head portions 13, and the body portions 11 are sequentially butted against one another in this order, or a width which is capable of forming six elements 10 in a state where the head portions 13, the body portions 11, the head portions 13, the body portions 11, and the head portions 13 are sequentially butted against one another in this order, may be used That is, it is sufficient if the elements 10 may be formed in a state where the elements 10 neighboring in the width direction are butted against each other in the body portions 11 or the head portions 13.

Figure 3:
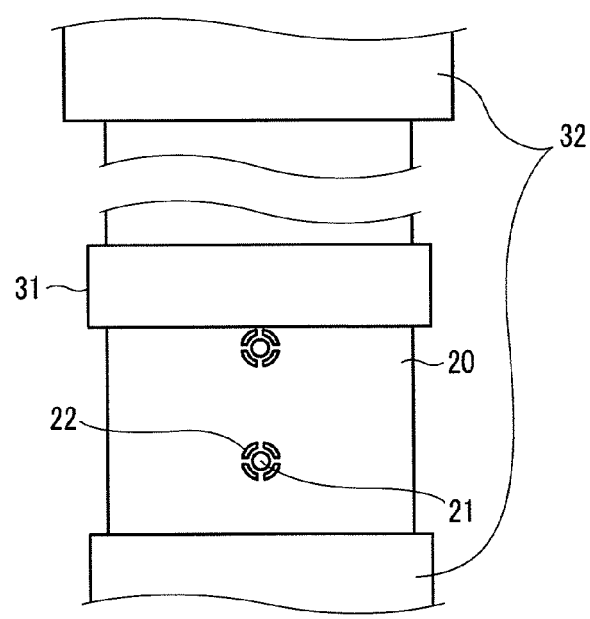
FIG. 3 A plane view showing a pilot hole according to the present embodiment.

FIG. 3 shows the pilot hole formed in the pilot hole forming process S1. As is shown in the figure, in the pilot hole forming process S1, the pilot hole 21 which is a piercing hole is formed, by a piercing process by a pilot hole forming element 31, to the metal band plate 20. The forming of the pilot hole 21 is performed to the metal band plate 20 transferred by a transferring element 32, at a predetermined interval in the length direction.

Further, to the metal band plate 20, four arc-like slit-shaped openings 22 surrounding the pilot hole 21 are formed. Instead of the openings 22, linear slits surrounding the pilot hole 21, or a plurality of piercing holes, may be formed. The transferring element 32 is capable of transferring and positioning the metal band plate 22 sequentially to downstream processing stations, via the pilot hole 21.

In the punching and removing process S2, a part of the metal band plate 20 is removed by the punching process. A size of the removed portion imparts influence on a processing accuracy in the plastic processing process S4. In order to optimize the processing accuracy, a "reference plastic processing volume" and an "actual plastic processing volume" are defined as follows.

Figure 4A:
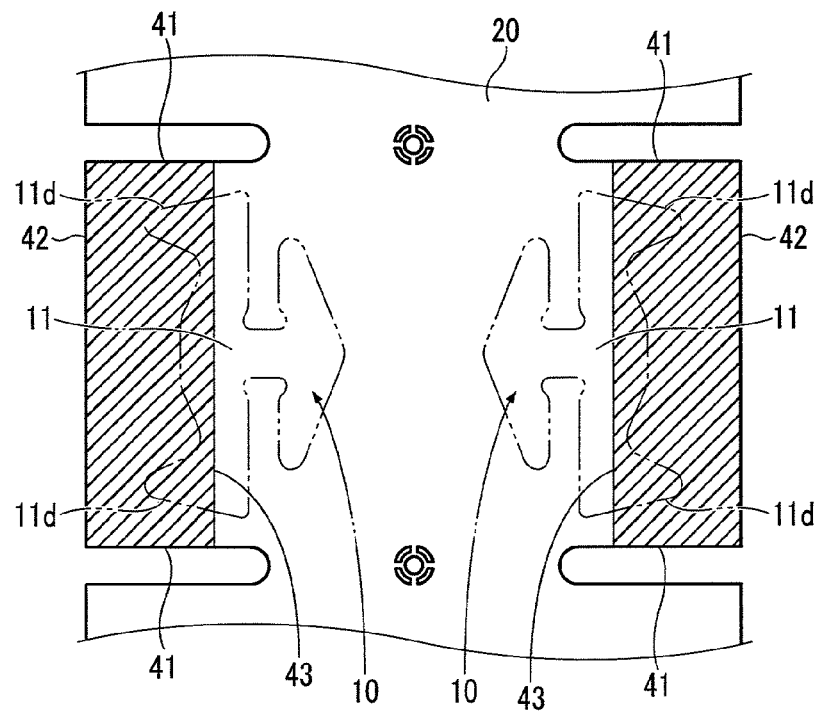
FIG. 4(a) is an explanatory view showing a reference plastic processing volume according to the present embodiment.
Figure 4B:
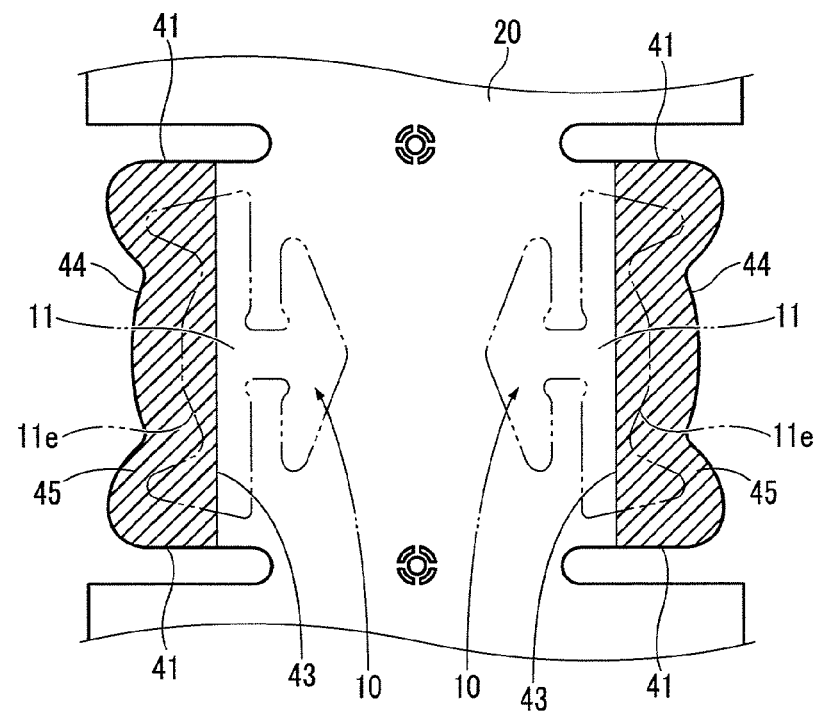
FIG. 4(b) is an actual plastic processing volume according to the present embodiment.

FIG. 4 shows a definition of the reference plastic processing volume and the actual plastic processing volume. As is shown in FIG. 4(a), the reference plastic processing volume is a volume of a portion surrounded by a line 41 corresponding to a contour of a portion which becomes the lateral (vertical in the figure) side surfaces 11d in the body portion 11, a rim 42 in the width direction of the metal band plate 20, and a straight line 43 extending the above-mentioned boundary line BL (FIG. 1), and that is provided with diagonal lines. As is shown in FIG. 4(b), the actual plastic processing volume is a volume of a portion surrounded by the line 41, a line 44 corresponding to a contour of a portion which becomes a lower end 11e of the body portion 11, and the straight line 43, and that is provided with diagonal lines.

In the punching and removing process S2, by punching the metal band plate 20 so that the line 41 and the line 44 are included in a punching line, as is shown in FIG. 4(b), portions below and sideways of the corresponding portion of the body portion 11 in the metal band plate 20 are removed.

That is, by punching the metal band plate 20 along the punching line including the line 41 and the line 44 set with a predetermined width outward from the contour of the lateral sides and lower side of the corresponding portion of the body portion 11 in the metal band plate 20, the portion of the metal band plate 20 from the contour to the line is left as a trimmed portion 45, and a portion of the metal band plate 20 outward of the trimmed portion 45 is removed.

The position of the line 44 is determined on the basis of the actual plastic processing volume. The reason therefor will be explained later, but a preferred value of the actual plastic processing volume is 80% or less of the reference plastic processing volume, and a more preferred value is 48% or less and 45% or more.

Figure 5:
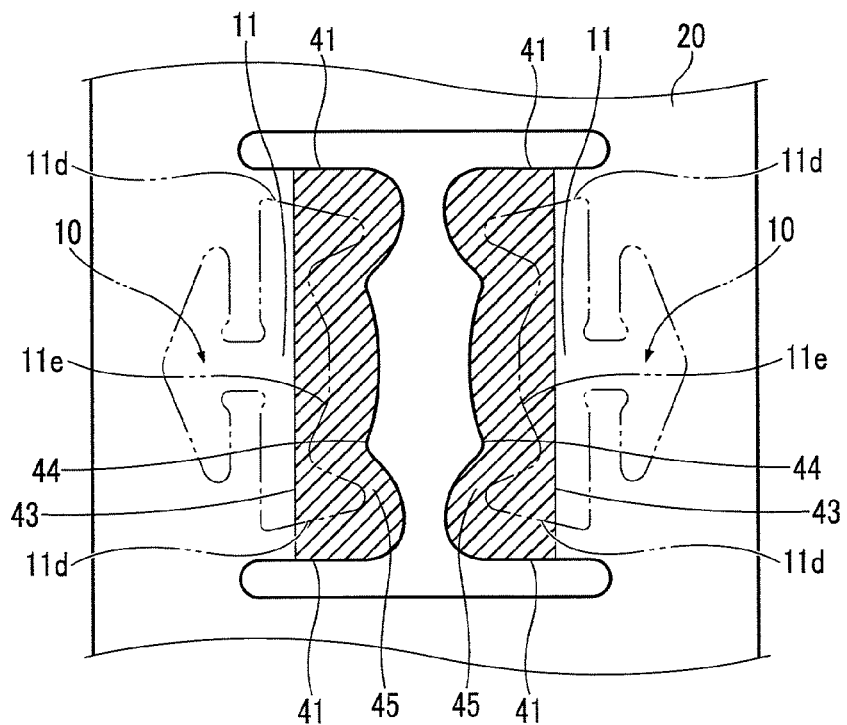
FIG. 5 An explanatory view showing another actual plastic processing volume according to the present embodiment.

FIG. 5 shows the definition of the actual plastic processing volume in the case where two elements 10 are formed in the state where the body portions 11 are butted against each other. Similarly to the case of FIG. 4(b), a volume of the portion surrounded by the line 41 corresponding to the contour of the lateral side surfaces 11d of the body portion 11, the line 44 corresponding to the contour of the lower end 11e of the body portion 11, and the straight line 43 extending the boundary line BL (FIG. 1), and which is provided with diagonal lines, is the actual plastic processing volume.

In this case, the punching process is performed along the line including the line 41 and the line 44, and the portion below and sideways of the body portion 11 in the metal band plate 20 is removed. Even in this case, the trimmed portion 45 similar to the case of FIG. 4 is left. Further, similar to the case of FIG. 4, it is preferable that the actual plastic processing volume is 80% or less of the reference plastic processing volume, and a more preferred value is 48% or less and 45% or more.

Figure 6:
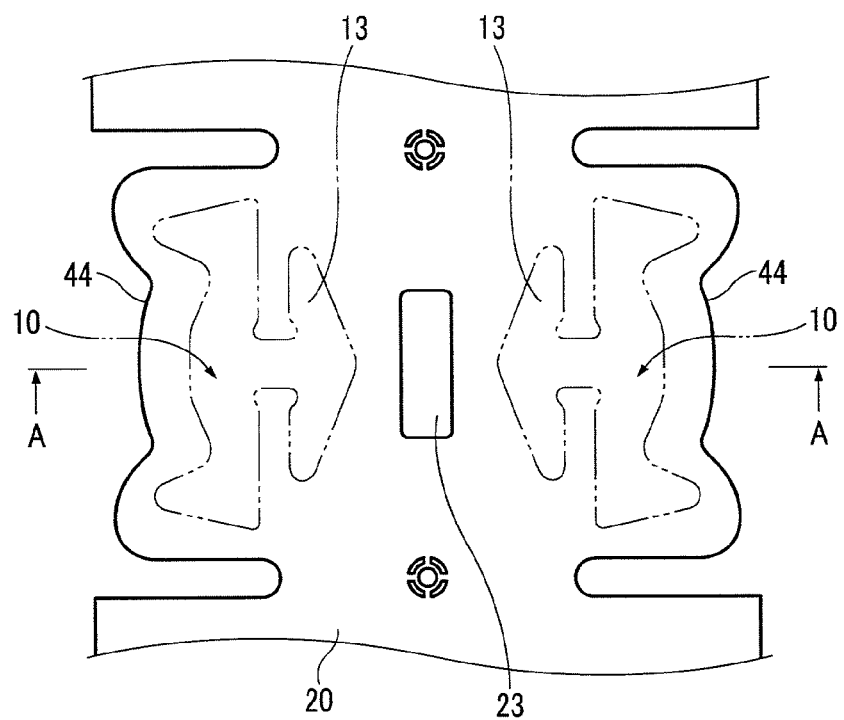
FIG. 6 A view showing a piercing hole formed in a piercing hole forming process according to a manufacturing of the element in FIG. 1.

FIG. 6 shows the piercing hole formed in the piercing hole forming process S3. In the piercing hole forming process S3, as is shown in the figure, the piercing hole is formed as a substantially rectangular slit-shaped piercing hole 23 between the corresponding portions of the butted head portions 13, by a piercing processing. The piercing hole forming process S3 may be performed simultaneously with the punching and removing process S2 on the same processing station.

Figure 7A:
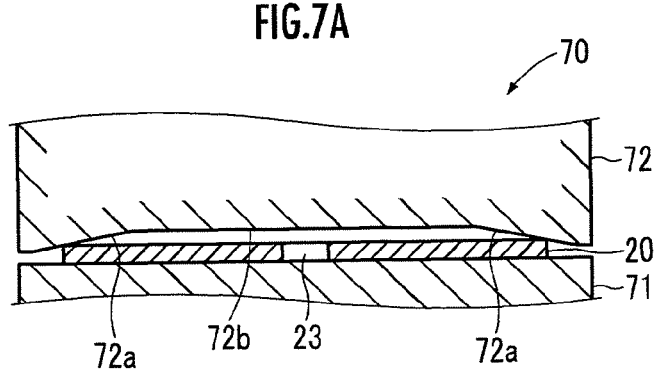
FIG. 7(a) and FIG. 7(b) are cross-sectional views showing a relevant part of a crushing processing station (press device) which performs a plastic processing in a plastic processing process according to the manufacturing of the element in FIG. 1.

FIG. 7 is a cross-sectional view showing a relevant part of a crushing processing station which performs the plastic forming (crushing process) in the plastic processing process S4. The crushing processing station is configured from a press device. As is shown in FIG. 7(a), the crushing processing station 70 is equipped with a die 71 having a flat upper surface, and a forming punch 72 opposing the die 71. In FIG. 7, a cross-section of the metal band plate 20 portion fed via the above-mentioned piercing hole forming process S3 is shown. This cross-section corresponds to an A-A cross-section in FIG. 6. That is, the feeding direction of the metal band plate 20 in FIG. 7 is a direction orthogonal to the paper.

The die 71 and the forming punch 72 are formed with forming surfaces, and configure a crushing processing element of implementing the crushing process by pressing the metal band plate 20 placed on the die 71 with the forming punch 72. The forming punch 72 is equipped with two inclined surfaces 72a forming the plate thickness of the portion corresponding to the thinned portion 11b of the element 10 by pressing and crushing the both end portions in the width direction of the metal band plate 20 placed on the die 71, and a flat surface 72b between the two inclined surfaces 72a. That is, in the crushing processing station 70, the plate thickness of the portion corresponding to the thinned portion 11b is formed by a coining process (the crushing process).

Figure 7B:
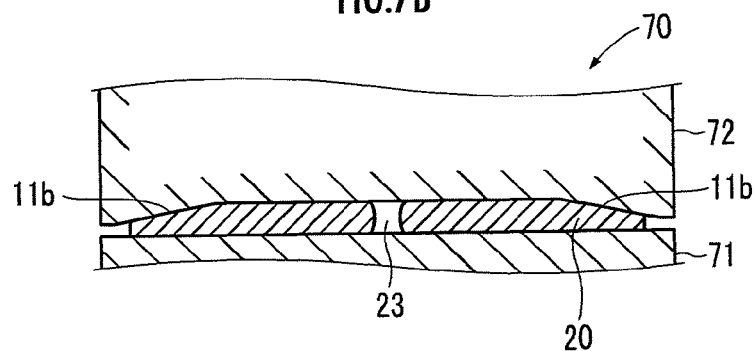

When the processing target portion of the metal band plate 20 is positioned on the die 71, the forming punch 72 is descended towards the die 71 by a driving mechanism. Thereafter, as is shown in FIG. 7(a), when the inclined surfaces 72a contact the end portions in the width direction of the metal band plate 20, the inclined surfaces 72a start pressing and crushing of the end portions in the width direction. When the forming punch 72 descends further to a predetermined position, as is shown in FIG. 7(b), the pressing and crushing of the end portions in the width direction is completed. By doing so, the plate thickness of the portion corresponding to the thinned portion 11b is formed.

Figure 14:
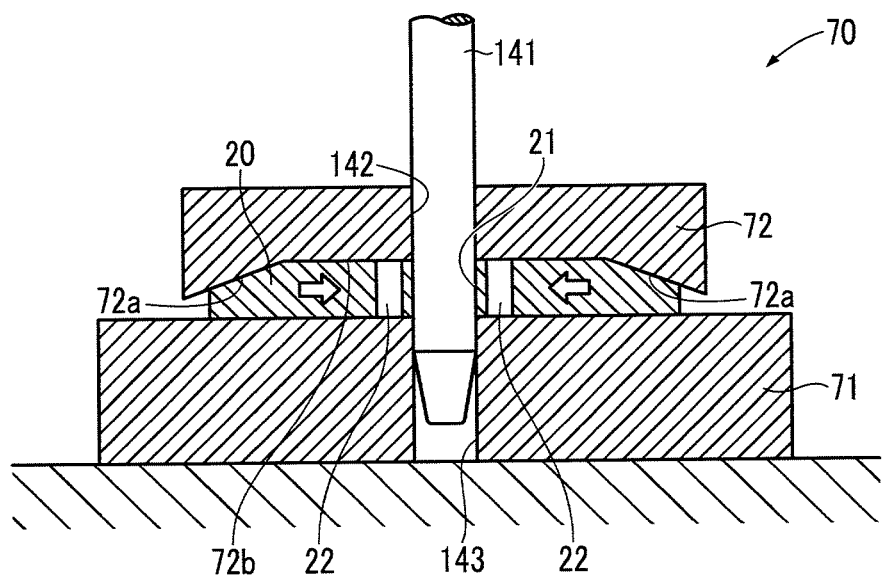
FIG. 14 An explanatory cross-sectional view showing a relationship between a pilot hole and a positioning pin.

As is shown in FIG. 14, the transferring element 32 (shown in FIG. 3) of the metal band plate 20 is equipped with a positioning pin 141 that is inserted to the pilot hole 21, and holes 142 and 143 are formed to the forming punch 72 and the die 71 at positions corresponding to the pilot hole 21. When the crushing process (coining process) is performed, the positioning pin 141 is maintained being inserted to the pilot hole 21 through the holes 142 and 143 of the forming punch 72 and the die 71. By doing so, when the crushing process is performed, the deformation of the pilot hole 21 is prevented surely.

The inclined surface 72a may be configured from a steep slope adjacent to the flat surface 72b, and a gentle slope adjacent to the steep slope. In this case, the thinned portion 11b is equipped with the steep slope and the gentle slope corresponding to the inclined surface 72a. The gentle slope portion may configure a parallel thinned portion substantially parallel to the rear surface of the thinned portion 11b.

Figure 12:
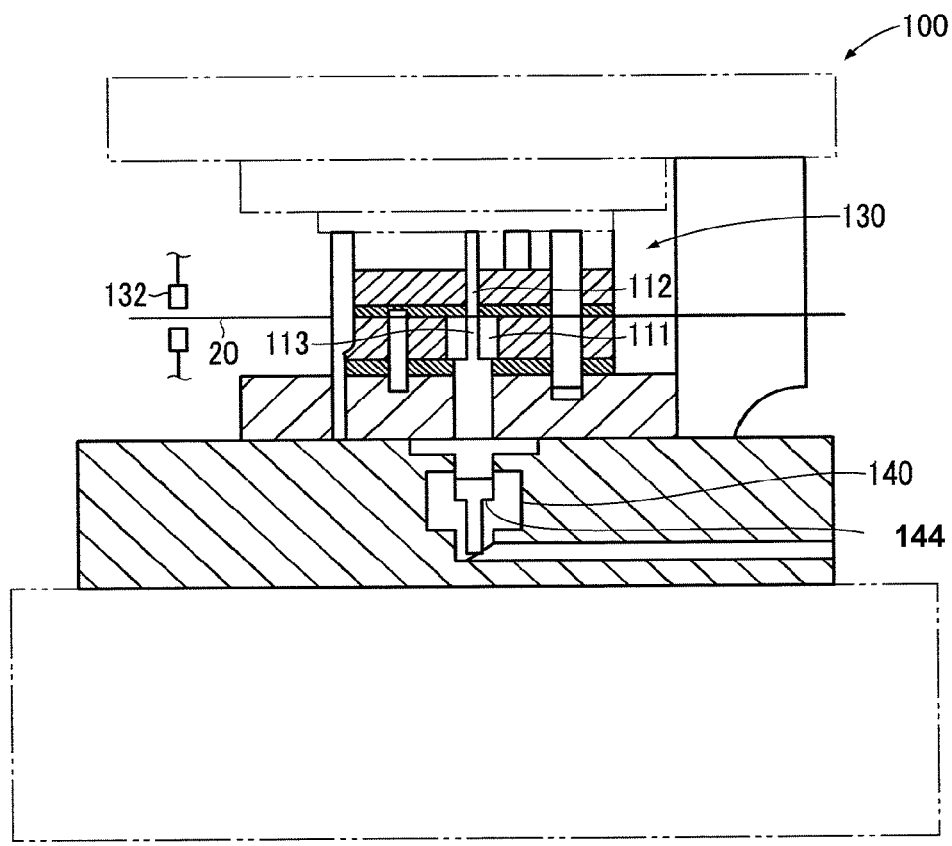
FIG. 12 A cross-sectional view showing an overall punching device.

Further, the crushing processing station 70 may be provided with a counter unit which imparts a counter load to the die 71 in a direction opposite to the pressing direction by the forming punch 72, and a load changing element which changes the counter load imparted to the die 71. In this case, as the counter unit, a counter unit 140 of a fluid pressure type, as is shown in FIG. 12 explained later, may be used. As the load changing element, a one similar to a control unit 160 of FIG. 16 which controls a pressure of a fluid of the counter unit 140 on the basis of a measurement result of the plate thickness at an upstream side by a plate thickness sensor 132 as is shown in FIG. 12 explained later, may be used.

Figure 8:
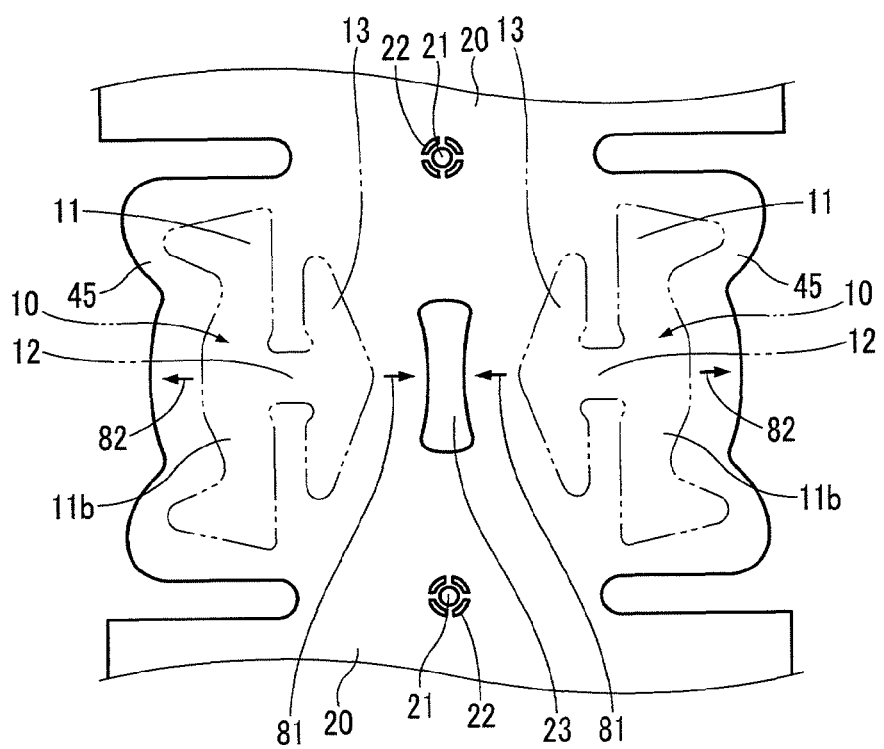
FIG. 8 A view showing how metal in the metal band plate moves by pressing and crushing in the plastic processing process according to the manufacturing of the element in FIG. 1.

FIG. 8 shows a situation where metal inside the metal band plate 20 moves by the pressing and crushing in the plastic processing process S4. As is shown in the figure, as the pressing and crushing progresses, a part of the metal in the metal band plate 20 flows toward the piercing hole 23, as is shown by an arrow 81. As a result, as is shown in FIG. 7(b), the width of the piercing hole 23 becomes small, and the flow of the metal is absorbed. Therefore, the thickness of the corresponding portion of the neck portion 12 does not become excessively thick.

Further, another part of the metal in the metal band plate 20 flows outwardly in the width direction of the metal band plate 20, as is shown by an arrow 82. As a result, the plate thickness of the corresponding portion of the thinned portion 11b is formed smoothly.

To the metal band plate 20, in the pilot hole forming process S1, the pilot hole 21 and four arc-like slit-shaped openings 22 surrounding the pilot hole 21 are formed. However, with the progress of the pressing and crushing in the plastic processing process S4, a part of the metal in the metal band plate 20 also flows in a direction of the pilot hole 21 surrounded by the openings 22. As a result, the width of the openings 22 becomes small, and the flow of the metal is absorbed. Therefore, the deformation of the pilot hole 21 mainly for positioning purpose is reduced. Further, during this time, the pilot hole 21 is kept inserted with the positioning pin 141, so that the pilot hole 21 does not deform by the flow of the metal.

Figure 9:
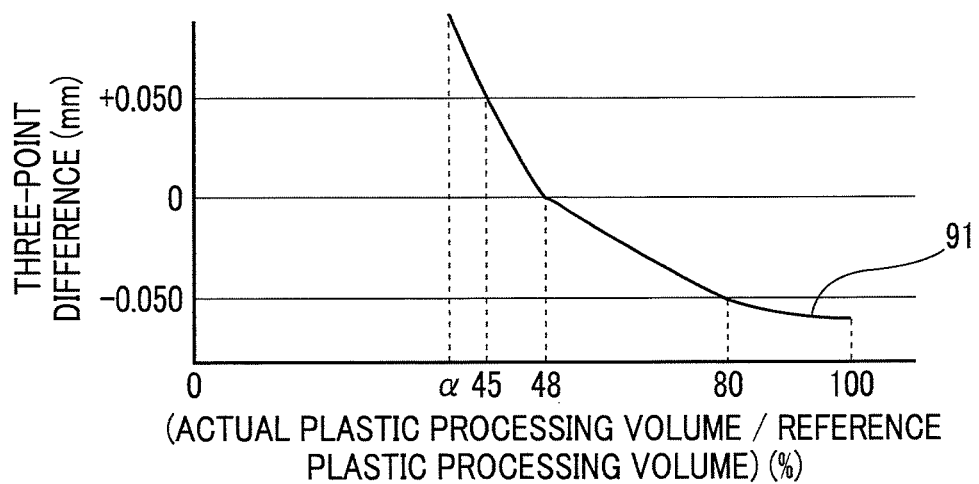
FIG. 9 A view showing a result of checking how a difference in the plate thickness in predetermined three points changes, according to a change of a proportion of the actual plastic processing volume with respect to the reference plastic processing volume defined in FIG. 4.

FIG. 9 shows a result of performing the processes up to the plastic processing process S4 while changing the proportion of the actual plastic processing volume with respect to the reference plastic processing volume, and examining how a difference in plate thicknesses in a predetermined three points change with respect to the change of the proportion. The plate thickness at three points corresponds to a plate thicknesses T(1) and T(2) of portions corresponding to the points C (FIG. 1) of lateral end portions of the head portion 13, and a plate thickness T(3) of a portion corresponding to the point B (FIG. 1) of the central portion of the body upper portion 11a. (T(1)+T(2))/2−T(3) is obtained as a three-point difference, and the change thereof is shown by a graph curve 91 in FIG. 9.

The measurement is performed by changing the proportion of the actual plastic processing volume by 5%, performing the processes up to the plastic processing process S4 seven times each for each proportion to the total of 147 times, so as to prepare 7 test pieces each for each proportion, and obtaining the three-point difference for each test piece.

As is shown in FIG. 9, as the proportion of the actual plastic processing volume with respect to the reference plastic processing volume approaches 48% from 100%, the three-point difference becomes smaller. In a range below 48%, for example in a range of 48 to α%, the three-point difference becomes larger as it becomes smaller than 48%. However, α% is a proportion of the actual plastic processing volume with respect to the reference processing volume in the case where no trimmed portion 45 exists.

That is, it is conceivable that when the proportion of the actual plastic processing volume is large, the metal flow in the direction of the arrow 82 (FIG. 8) in the plastic processing process S4 is interrupted, so that a variation of the plate thicknesses at the three points is generated, and that when the proportion of the actual plastic processing volume is small, the metal flow in the direction of the arrow 82 becomes smooth, and the plate thicknesses at the three points becomes uniform.

However, if the proportion drops below 48%, the variation of the plate thicknesses at the three points is once again generated. That is, it is conceivable that when the proportion of the actual plastic processing volume is small, the metal flow in the direction of the arrow 82 becomes too smooth, so that the plate thicknesses at the three points become uneven. Stated otherwise, the portion left at the metal band plate 20 as the trimmed portion 45 influences the three-point difference, and it becomes possible to control the three-point difference by controlling the volume of the trimmed portion 45.

Therefore, in the present embodiment, as is explained above, the proportion of the actual plastic processing volume is set to be 80% or less and 45% or more, and so that the three-point difference lies in the range of −0.050 to +0.050 mm. Further, as a preferred proportion of the actual plastic processing volume is set to 48% or less and 45% or more, and the three-point difference becomes a target value of 0 mm. As is explained above, it is conceivable that the three-point difference cannot be controlled if no trimmed portion 45 exists, and the plate thicknesses at the three points have variation.

Figure 10:
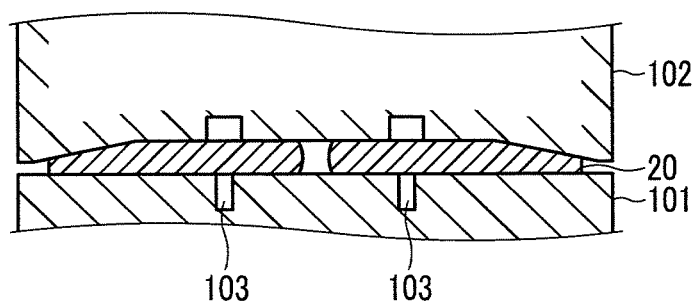
FIG. 10 An explanatory cross-sectional view showing a hole and nose forming process according to the manufacturing of the element.

FIG. 10 is a cross-sectional view showing a processing in the hole and nose forming process S5. As is shown in the figure, in the hole and nose forming process S5, the processing target portion of the metal band plate 20 completed with the processes up to the plastic processing process S4 is held by a lower mold 101 and an upper mold 102, and the hole 13*d* and the nose 13*c* (FIG. 1) are formed by pushing a pin 103 upward from the lower mold 101. The formation of the hole 13*d* and the nose 13*c* is included in the plastic forming, so that it may be performed in the above-explained plastic processing process S4.

Figure 11A:
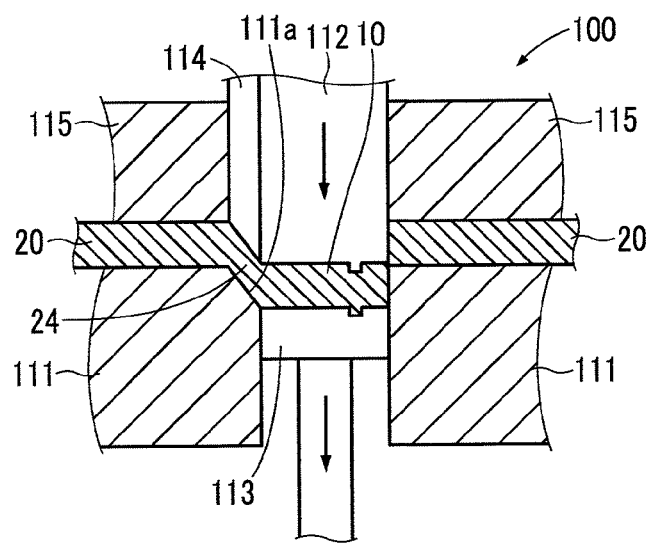
FIG. 11(a) and FIG. 11(b) are explanatory cross-sectional views showing a relevant part of the punching device.
Figure 11B:
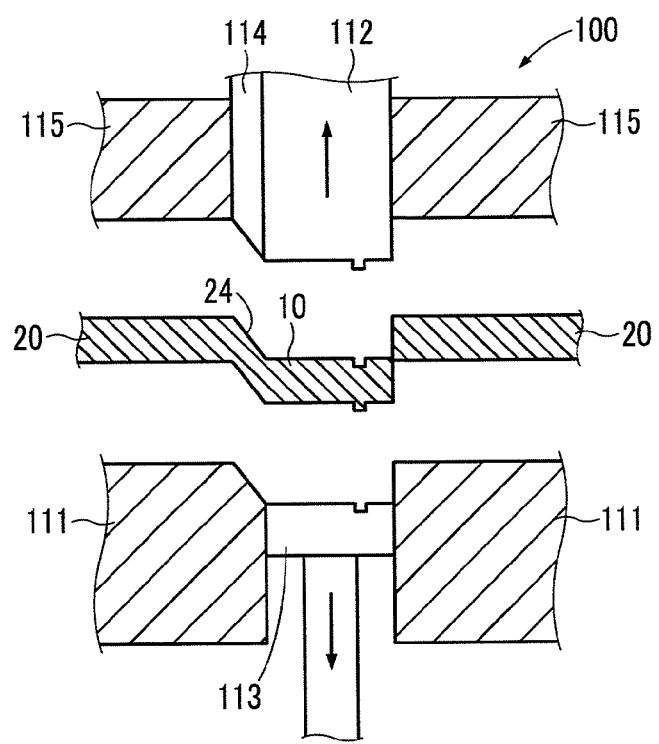

FIG. 11 shows an outline of a relevant part of the punching device as a pressing device which performs punching of the corresponding portion of the element 10 in the element punching process S6. As is shown in FIG. 11, the punching device 100 is equipped with a die 111 on which the metal band plate 20 is placed, and a punching punch 112 which punches the metal band plate 20 on the die 111 into an element shape. A counter punch 113 which descends accompanying the descending of the punching punch 112 is provided to a position opposing the punching punch 112.

FIG. 12 is a cross-sectional view showing the overall punching device 100 in FIG. 11. As is shown in FIG. 12, the punching device 100 punches the element 10 from the metal band plate 20, by applying a counter load in an upward direction opposite to the punching direction to the corresponding portion of the element 10 on the metal band plate 20. The application of the counter load is performed by the counter punch 113.

Figure 16:
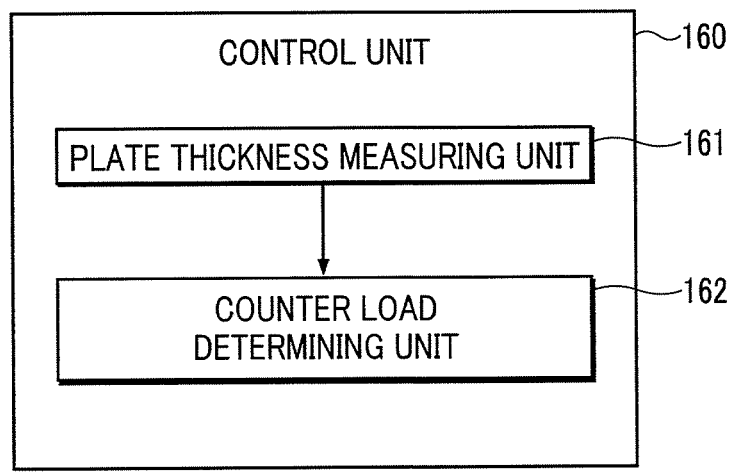
FIG. 16 A block diagram showing a frame format of a configuration of a control unit.

The punching device 100 is equipped with a punching mechanism 130 configured using the die 111, the punching punch 112, and the counter punch 113, a counter unit 140 which generates the counter load, and the control unit 160 comprising a CPU, a memory and the like (FIG. 16). The counter unit 140 generates the counter load to the counter punch 113, by variably applying a pressure of a fluid via a hydraulic cylinder 144.

The control unit 160 may change the counter load, when the transferring element 32 is moving the metal band plate 20 so as to position the same with respect to the punching mechanism 130, or when the punching mechanism 130 is operating, by increasing or decreasing the pressure of the fluid by controlling the counter unit 140.

To the upstream side of the punching mechanism 130, a plate thickness sensor 132 which detects the plate thickness of the metal band plate 20 is provided. As the plate thickness sensor 132, well-known sensors of a contact type or a non-contact type may be used. As the contact type sensor, for example, the one measuring the thickness by clamping a measurement portion on the metal band plate 20 by two linear gauges with rollers provided at a tip thereof, qualifies. As the non-contact type, the one measuring the plate thickness of the measurement portion, by measuring the positions of both upper and lower surfaces at the measurement portion on the metal band plate 20 by a laser sensor or an eddy-current sensor, qualifies.

Returning back to FIG. 11, to one side of the punching punch 112, there is provided a joining portion forming punch 114 which forms a joining portion 24 connecting to the corresponding portion of the element 10. To a part of the die 111 corresponding to the joining portion forming punch 114, there is provided a clearance portion 111*a*. Above the die 111, there is provided a pad 115 for pressing the metal band plate 20 onto the die 111.

As is shown in FIG. 16, the control unit 160 is equipped with a plate thickness measurement unit 161 which measures the plate thickness of the metal band plate 20 of the portion corresponding to a predetermined portion of the element 10 by the plate thickness sensor 132, prior to the punching of the element 10 by the punching mechanism 130, and a counter load determining unit 162 which determines the counter load to be generated by the counter unit 140 on the basis of the measurement result by the plate thickness measuring unit 161. The plate thickness of a specific portion to be measured by the plate thickness measuring unit 161, is the plate thickness of the metal band plate 20 corresponding to the both end portions A of the body upper portion 11*a*, and the both end portions C of the head portion 13 of the element 10 (FIG. 1).

Prior to punching of the element 10, the control unit 160 performs the measurement of the plate thickness by the plate thickness measuring unit 161, the determination of the counter load by the counter load determining unit 162, and the change of the counter load on the basis of the determined counter load, at each punching of the element 10 by the punching mechanism 130.

As is shown in FIG. 15, the element punching process S6 is equipped with a plate thickness measuring process S6A of measuring the plate thickness of the processing target portion, a counter load setting process S6B of setting the counter load on the basis of the measurement result, and a punching processing process S6C of punching the element from the processing target portion by the set counter load. The plate thickness measuring process S6A and the counter load setting process S6B are performed at each element punching process S6, prior to the punching processing process S6C by the punching device 100.

In the plate thickness measuring process S6A, the plate thickness of the predetermined position of the corresponding portion of the element 10 at the processing target portion is measured by the plate thickness measuring unit 161 of the control unit 160, before the processing target portion on the metal band plate 20 completed with each processing processes up to the hole and nose forming process S5 is sent to the punching device 100. The measurement portion is, for example, a portion required to have high plate thickness accuracy in the corresponding portion of the element 10. Specifically, for example, the portions corresponding to the both ends portions A of the body upper portion 11*a*, the central portion B, and the both end portions C of the head portion 13, qualifies (FIG. 1). It may be an average value for a plurality of portions, and the like.

In the counter load setting process S6B, the counter load at the punching device 100 is determined by the counter load determining unit 162, on the basis of the measurement result by the plate thickness measuring process S6A. The determined counter load is set to the counter unit 140 by the control unit 160.

The value of the counter load to be set is determined so that the plate thickness accuracy of the corresponding portion of the element 10 after the punching processing process S6C is within a range of a predetermined target value. The element 10 is used by being superimposed in the thickness direction, so that if the plate thickness is uneven, it becomes a cause of meandering of the belt for the continuously variable transmission, and provides negative effect to the efficiency of the continuously variable transmission and the like.

The plate thickness accuracy of the corresponding portion of the element 10 after the punching processing process S6C varies according to the plate thickness accuracy of the corresponding portion of the element 10 before the punching processing process S6C, and the counter load when performing the punching processing process S6C.

Figure 13:
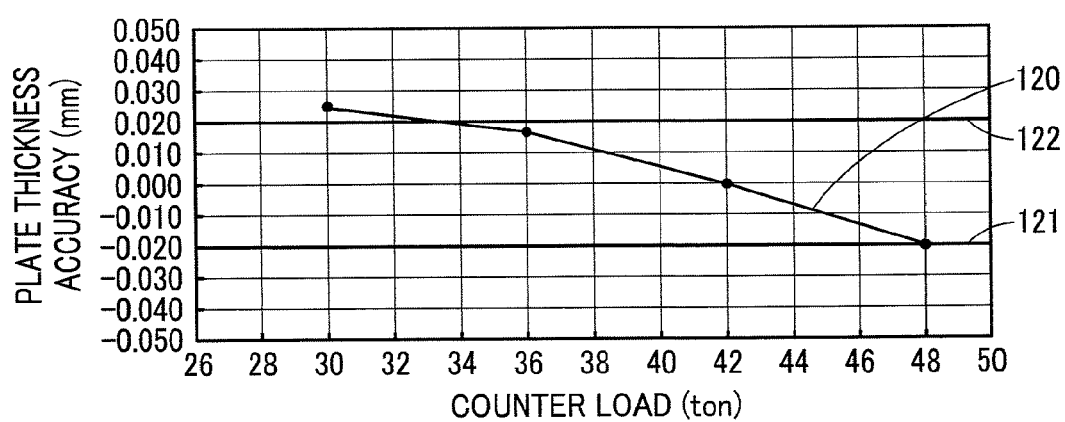
FIG. 13 A view showing an example of a setting data of a counter load.

FIG. 13 shows an example of a data that may be referred when setting the counter load. A graph curve 120 in the figure shows how the plate thickness accuracy after processing differs according to the counter load, in the case where the corresponding portion of the element 10 having a predetermined plate thickness accuracy a is performed with the punching processing by the punching device 100. The graph curve 120 is on the basis of the plate thickness accuracy obtained by actually performing the element punching process S6, and measuring the plate thicknesses before and after the process similarly to the above-explained plate thickness measuring process S6A.

That is, the graph curve 120 shows how the counter load changes the plate thickness accuracy of the element 10, in the element punching process S6. By referring to the graph curve 120, it is found that, for example by changing the counter load from 30 tons to 36 tons, the plate thickness accuracy changes by approximately 0.008 mm. Further, it is found that by changing the counter load from 42 tons to 48 tons, the plate thickness accuracy changes by approximately 0.020 mm.

Lines 121 and 122 in the figure define the range of the target value of the plate thickness accuracy after the punching processing process S6C. Therefore, in the counter load setting process S6B, the counter load is set by referring to the data such as FIG. 13, so that the plate thickness accuracy of the corresponding portion of the element 10 after the punching process by the punching device 100 is a value between the line 121 and the line 122, that is, approximately from −0.020 to 0.020 mm.

In the punching processing process S6C, the punching of the corresponding portion of the element 10 by the punching device 100 is performed, with the counter load set by the counter load setting process S6B. That is, first, the processing target position on the metal band plate 20 positioned on the die 111 is fixed onto the die 111 by the pressing by the pad 115. Subsequently, as is shown in FIG. 11(*a*), the corresponding portion of the element 10 is punched by the descending of the punching punch 112, in the state where the metal band plate 20 is held from below by the counter punch 113.

At the same time, the joining portion 24 is formed by the joining portion forming punch 114 descending together with the punching punch 112, and the clearance portion 111*a* on the die 111 side corresponding to the joining portion forming punch 114. During this time, as is shown in FIG. 13, the plate thickness accuracy changes according to the counter load.

Subsequently, as is shown in FIG. 11(*b*), by elevating the punching punch 112, the joining portion forming punch 114, the counter punch 113, and the pad 115, the processing target position in the state where the corresponding portion of the element 10 is joined via the joining portion 24 is discharged. By doing so, the element punching process S6 is completed.

Thereafter, the joining portion 24 is cut, and the corresponding portion of the element 10 is separated from the other portion of the metal band plate 20. The corresponding portion of the element 10 is performed with processing such as deburring, according to need, and becomes the element 10 as the product The joining portion 24 is formed so as to connect to the center of the lower end of the corresponding portion of the body portion 11, or to the center of the upper end of the corresponding portion of the head portion 13. In the case where the joining portion 24 is formed to the center of the lower end of the corresponding portion of the body portion 11, it becomes necessary to leave the portion corresponding to the lower end center of the corresponding portion of the body portion 11 in the punching and removing process S2 and do not remove the same.

According to the present embodiment, the following effects may be obtained. First, as is explained above, the element 10 for continuously variable transmission manufactured according to the present embodiment has the relationship of Tc≥Tb>Ta, Tc>Td between the plate thickness Ta of the both end portions A of the body upper portion 11*a*, the plate thickness Tb of the central portion B, the plate thickness Tc of the both end portions C of the head portion 13, and the plate thickness Td of the central portion 13*a*, so that in the belt for the continuously variable transmission configured by superimposing the plurality of elements 10 annularly, the curving to the inner circumferential side is performed smoothly. Therefore, the laminating shape of each element 10 may be a good laminating shape that the laminating direction does not bend to the head portion 13 side.

Further, when such belt for the continuously variable transmission is placed around the pulley 8 of the continuously variable transmission, the swinging of the belt for the continuously variable transmission to the outer peripheral direction may be prevented. Therefore, it becomes possible to perform stable power transmission, without damaging the endless ring 7 or the element 10 constituting the belt for the continuously variable transmission.

Further, when the plurality of the elements 10 are laminated annularly, the element 10 contacts the adjacent element 10, at a relatively thick portion, that is, the both end portions C of the head portion 13 and the central portion B of the body upper portion 11*a*, so that a very stable laminating state may be obtained. Therefore, it becomes possible to perform effective power transmission, while preventing the meandering of the belt for the continuously variable transmission and the like.

That is, as is shown in FIG. 1(*b*), the plate thickness Ta of the both end portions A is certainly made smaller than the plate thickness Tb of the central portion B of the body upper portion 11*a*, and the plate thickness Tb of the central portion B of the body upper portion 11*a* is made the same or smaller than the plate thickness Tc of the both end portions C of the head portion 13. By doing so, when forming the belt for the continuously variable transmission by laminating a plurality of the elements 10 annularly, a stable laminating state may be obtained by the contact of the both end portions C of the head portion 13 and the central portion B of the body upper portion 11*a* of each element 10, and further, it becomes possible to surely prevent each element 10 from curving to converge to the head portion 13 side. Therefore, when the belt for the continuously variable transmission using the element 10 is placed around the pulley 8 of the continuously variable transmission, a stable power transmission may be performed without damaging the element 10 by unnecessary contact with the endless ring 7 (metal ring).

Further, it is configured so that the control unit 160 may change the counter load, when the transferring element 32 is transferring the metal band plate 20, or when the punching mechanism 130 is in operation, by increasing or decreasing the pressure of the fluid in the counter unit 140. Therefore, it becomes possible to omit the difficult adjustment operation of disassembling the counter unit and changing a disc spring, in order to change the counter load as in the conventional art.

Further, by removing the outer side of the trimmed portion 45 of a predetermined width corresponding to the corresponding portion of the body portion 11 and leaving the trimmed portion 45, and forming the plate thickness of the corresponding portion of the thinned portion 11*b* by the coining processing, in the punching and removing process S2, it becomes possible to adjust the volume of the portion of the metal band plate 20 being pressed and crushed by the coining processing, by appropriately selecting the width and the area of the trimmed portion 45. By adjusting the volume, it becomes possible to obtain an appropriate plate thickness for the corresponding portion of the body portion 11, by controlling a magnitude of the flow of the metal by the pressing and crushing.

Therefore, it is not necessary to preliminarily prepare a metal band plate as a coiled material formed with a portion with thin plate thickness corresponding to the thinned portion 11b along the whole material being formed by a roll processing and the like, as is in the conventional art, and it becomes possible to manufacture the element 10 with high accuracy, by performing the punching and removing process S2, the plastic processing process S4, the element punching process S6 and the like directly to the metal band plate 20 having overall uniform plate thickness.

Further, in the case of forming rows of the elements 10 in an even number in the width direction with the head portions 13 butted against each other, the piercing hole forming process S3 for forming the piercing hole 23 between the corresponding portions of the head portions 13 butted against each other in the processing target portion of the plastic processing process S4, is provided before the plastic processing process S4. Therefore, the flow of the metal towards the center in the width direction of the metal band plate 20 generated during the coining processing in the plastic processing process S4, may be absorbed by the contraction of the piercing hole 23 formed between each corresponding portions of the head portions 13.

By doing so, it becomes possible to prevent the plate thickness of the corresponding portion of the neck portion 12 of the element 10 from becoming excessively thick. Further, by appropriately selecting the size of the piercing hole 23, it becomes possible to adjust the magnitude of the flow of the metal, and easily control the thickness of the neck portion 12.

Therefore, the element 10 with high plate thickness accuracy may be manufactured, without the need for using a conventional process requiring cumbersome processes, such as cutting a flat plate from a metal band plate, forming notch portions at approximately midway of the flat plate, and cutting elements from the flat plate. Further, unlike such conventional method, it becomes possible to avoid the plate thickness of the central portion of the metal band plate 20 itself from becoming thick.

Further, in the case of forming the piercing hole 23 in a slit-shape, it becomes possible to easily adjust the magnitude of the flow of the metal, and to control the plate thickness of the neck portion 12 and the like, by appropriately selecting the size of the piercing hole 23 in the longitudinal direction.

Further, prior to the punching and removing process S2, the pilot hole 21, and the opening 22 which surrounds the pilot hole 21, are formed sequentially in a predetermined interval to the transferred metal band plate 20, so as to transfer and perform positioning in each processing station via the pilot hole 21. Therefore, when implementing the plastic processing process S4, it becomes possible to surely prevent the pilot hole 21 itself from deforming, even if the flow of the metal is generated, by absorbing the flow of the metal by the opening 22 surrounding the pilot hole 21. Therefore, it becomes possible to favorably maintain the positioning accuracy using the pilot hole 21 with respect to each processing station.

Further, when implementing the plastic processing process S4, the positioning pin 141 for positioning the processing target portion is inserted to the pilot hole 21 corresponding to the processing target portion of the process, so that it becomes possible to surely prevent the deformation of the pilot hole 21, even in the case where the flow of the metal from the coining processing is generated.

Further, conventionally, a disc spring is used in the counter unit for generating the counter load, and the adjustment of the counter load must be performed by disassembling the counter unit, so that the adjustment of the counter load could not be performed appropriately and easily. As such, in the case where the plate thickness accuracy of the material changed from the change of the lot of the material with the counter load left unadjusted, there is a fear that bias in the plate thickness of the element after punching is generated.

In contrast thereto, according to the present embodiment, in the element punching process S6, each time the element punching process S6 is performed, prior to the punching processing process S6C, the setting of the counter load is performed by performing the plate thickness measurement for the corresponding portion of the element 10, and feed-forwarding the result thereof. Therefore, it becomes possible to improve the plate thickness accuracy of the corresponding portion of the element 10 after punching processing, and to manufacture the element 10 with good size accuracy.

Further, the present invention is not limited to the above-explained embodiment, and may be implemented while appropriately varying the same. For example, in the above-explained embodiment, in the element punching process S6, each time the element punching process S6 is performed, prior to the punching processing process S6C, the counter load is set by performing the plate thickness measurement for the corresponding portion of the element 10, and feed-forwarding the result thereof. Instead, the counter load may be set by performing the plate thickness measurement for the corresponding portion of the element 10 which the punching process has been performed, and feed-forwarding the measurement result thereof, each time the element punching process S6 is performed.

In this case, the control unit 160 of the punching device 100 is capable of performing, at each punching of the work by the punching mechanism 130, after the punching, the measurement of the plate thickness by the plate thickness measuring unit 161, the determination of the counter load by the counter load determining unit 162, and the change of the counter load on the basis of the determined counter load.

Figure 17:
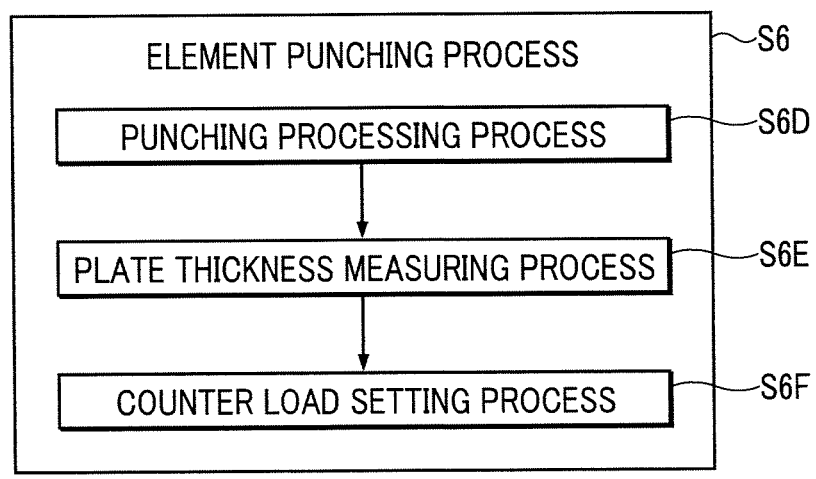
FIG. 17 A block diagram showing another example of an element punching process.

Thereafter, as is shown in FIG. 17, the element punching process S6 includes a punching processing process S6D of punching the element 10 by performing a punching processing with respect to the processing target portion of the process by a press device with a set counter load, a plate thickness measuring process S6E of measuring the plate thickness at a predetermined position of the element 10 punched in the punching processing process at each punching processing process S6D, and a counter load setting process S6F of setting a counter load prior to the element punching process S6 with respect to the next processing target portion.

According thereto, it becomes possible to improve the plate thickness accuracy of the corresponding portion of the element 10 after the punching processing, and to manufacture the element 10 with good size accuracy, by appropriately performing the above-explained feedback.

Further, in the above-explained embodiment, the hole and nose forming process S5 and the element punching process S6 are performed separately. In stead, the hole and nose forming process S5 and the element punching process S6 may be performed simultaneously. In this case, it becomes possible to improve the position accuracy of the hole 13d and the nose 13c in the element 10.

INDUSTRIAL APPLICABILITY

The work-punching device and the work-punching method according to the present invention is preferably used for punching the work for the element for the continuously variable transmission and the like, by appropriately controlling the counter load according to the thickness of the material and the like. Further, the manufacturing method of the element for the continuously variable transmission according to the present invention is preferably used when manufacturing the element for the continuously variable transmission with high accuracy, from a planar material having constant thickness with simple process, without using a special rolling machine.

REFERENCE SIGNS LIST

8 . . . pulley, 10 . . . element (work), 11 . . . body portion, 11a . . . body upper portion, 11b . . . tapered portion or thinned portion, 12 . . . neck portion, 13 . . . head portion, 20 . . . metal band plate (metal plate material), 21 . . . pilot hole, 22 . . . opening, 23 . . . piercing hole, 31 . . . pilot hole forming element, 32 . . . transferring element, 45 . . . trimmed portion, 70 . . . crushing processing station, 71, 111 . . . die, 72 . . . forming punch, 112 . . . punching punch, 113 . . . counter punch (counter load applying element), 100 . . . punching device, 132 . . . plate thickness sensor (plate thickness detecting element), 140 . . . counter unit (counter load generating element), 141 . . . positioning pin, 142, 143 . . . hole, 160 . . . control unit (controlling element, load changing element), 161 . . . plate thickness measurement unit, 162 . . . counter load determining unit, A . . . both end portions of body upper portion, C . . . both end portions of head portion.

The invention claimed is:

1. A work-punching device for a work, the work comprising: a body portion, with lateral sides thereof constituting contact surfaces contacting a pulley for a continuously variable transmission, and which includes a tapered portion in which a thickness of the body portion is gradually reduced or a thinned portion with a thinned thickness, from a predetermined vertical position to a lower end thereof, a neck portion which extends upward from a central portion of an upper end of the body portion, and a head portion positioned on the neck portion, and being processed into an element for the continuously variable transmission, the device comprising:
a die;
a transferring element which transfers a metal plate material onto the die;
a punching punch which punches a work from the metal plate material transferred onto the die;
a counter punch which applies a counter load in a direction opposite to a punching direction by the punching punch to a portion of the metal plate material which becomes the work;
a counter load generating element which generates the counter load by applying a pressure of a fluid variably to the counter punch;
a control element which controls the counter load generating element by increasing and decreasing the pressure of the fluid; and
a plate thickness detecting element which detects a plate thickness,
wherein the control element comprises
a plate thickness measuring unit which measures the plate thickness with the plate thickness detecting element, and
a counter load determining unit which determines the counter load to be generated by the counter load generating element, on the basis of a measurement result by the plate thickness measuring unit,
wherein a measurement of the plate thickness of the metal plate material of a portion corresponding to the work, and a determination of the counter load on the basis of the measurement result, are performed at each punching of the work, prior to the punching thereof,
wherein the metal plate material is a long-continuous metal band plate,
the work-punching device comprises a pilot hole forming element which forms a pilot hole and an opening surrounding the pilot hole at a predetermined interval in a length direction with respect to the metal band plate transferred by the transferring element,
the transferring element is for transferring and positioning the metal band plate via the pilot hole sequentially to a downstream processing station,
the work-punching device further comprises a crushing processing station as the downstream processing station,
the crushing processing station comprises
a crushing processing element which includes a forming die and a forming punch formed with a forming surface, and which implements a crushing processing by pressing the metal band plate placed on the forming die with the forming punch,
a counter load applying element which applies a second counter load to the die in a direction opposite to a pressing direction by the crushing processing element, and
a load changing element which changes the second counter load to be applied to the die.

2. A work-punching device for a work, the work comprising: a body portion, with lateral sides thereof constituting contact surfaces contacting a pulley for a continuously variable transmission, and which includes a tapered portion in which a thickness of the body portion is gradually reduced or a thinned portion with a thinned thickness, from a predetermined vertical position to a lower end thereof, a neck portion which extends upward from a central portion of an upper end of the body portion, and a head portion positioned on the neck portion, and being processed into an element for the continuously variable transmission, the device comprising:
a die;
a transferring element which transfers a metal plate material onto the die;
a punching punch which punches a work from the metal plate material transferred onto the die;
a counter punch which applies a counter load in a direction opposite to a punching direction by the punching punch to a portion of the metal plate material which becomes the work;
a counter load generating element which generates the counter load by applying a pressure of a fluid variably to the counter punch;
a control element which controls the counter load generating element by increasing and decreasing the pressure of the fluid; and
a plate thickness detecting element which detects a plate thickness,
wherein the control element comprises
a plate thickness measuring unit which measures the plate thickness with the plate thickness detecting element, and
a counter load determining unit which determines the counter load to be generated by the counter load generating element, on the basis of a measurement result by the plate thickness measuring unit,
wherein a measurement of the plate thickness of the metal plate material of a portion corresponding to the work, and a determination of the counter load on the basis of the measurement result, are performed at each punching of the work, prior to the punching thereof, wherein the metal plate material is a long-continuous metal band plate, the work-punching device comprises a pilot hole forming element which forms a pilot hole and an opening surrounding the pilot hole at a predetermined interval in a length direction with respect to the metal band plate transferred by the transferring element, the transferring element is for transferring and positioning the metal band plate via the pilot hole sequentially to a downstream processing station, the work-punching device further comprises a crushing processing station as the downstream processing station, the crushing processing station comprises a crushing processing element which includes a forming die and a forming punch formed with a forming surface, and which implements a crushing processing by pressing the metal band plate placed on the forming die with the forming punch, a counter load applying element which applies a second counter load to the die in a direction opposite to a pressing direction by the crushing processing element, and a load changing element which changes the second counter load to be applied to the die, the work-punching device further comprises a positioning pin to be inserted into the pilot hole, wherein a hole for inserting the positioning pin is formed to the forming punch and the die, and when the crushing processing is implemented, the positioning pin remains inserted in the pilot hole through the holes of the forming punch and the die.

* * * * *